(12) United States Patent
Wu

(10) Patent No.: US 11,246,112 B2
(45) Date of Patent: Feb. 8, 2022

(54) POSITION-BASED AUTOMATIC CONFIGURATION OF PORTABLE DEVICE

(71) Applicant: Novatel Wireless, Inc., San Diego, CA (US)

(72) Inventor: John Jun Wu, San Diego, CA (US)

(73) Assignee: Novatel Wireless, Inc, San Diego, CA (US)

( * ) Notice: Subject to any disclaimer, the term of this patent is extended or adjusted under 35 U.S.C. 154(b) by 0 days.

(21) Appl. No.: 14/060,497

(22) Filed: Oct. 22, 2013

(65) Prior Publication Data

US 2014/0310432 A1  Oct. 16, 2014

Related U.S. Application Data

(63) Continuation of application No. 11/738,337, filed on Apr. 20, 2007, now Pat. No. 8,565,779.

(51) Int. Cl.
*H04W 64/00* (2009.01)
*H04M 1/72457* (2021.01)
*G06F 9/4401* (2018.01)
*G06F 13/38* (2006.01)

(52) U.S. Cl.
CPC ........ *H04W 64/003* (2013.01); *G06F 9/4415* (2013.01); *G06F 13/385* (2013.01); *H04M 1/72457* (2021.01); *H04M 2250/10* (2013.01)

(58) Field of Classification Search
None
See application file for complete search history.

(56) References Cited

U.S. PATENT DOCUMENTS

| | | | |
|---|---|---|---|
| 5,265,238 A | 11/1993 | Canova et al. | |
| 5,581,261 A | 12/1996 | Hickman et al. | |
| 6,633,762 B1 | 10/2003 | Rauscher | |
| 6,937,569 B1 | 8/2005 | Sarkar et al. | |
| 7,263,078 B2 * | 8/2007 | Krantz | H04W 48/16 370/328 |
| 7,516,412 B1 | 4/2009 | de Waal et al. | |
| 7,643,835 B1 | 1/2010 | Nosack et al. | |
| 7,792,874 B1 | 9/2010 | Clarke | |
| 8,024,487 B2 * | 9/2011 | Bhanu | H04W 8/005 709/250 |
| 2002/0077126 A1 | 6/2002 | Pihl et al. | |
| 2002/0119788 A1 | 8/2002 | Parupudi | |
| 2002/0194498 A1 | 12/2002 | Blight et al. | |
| 2003/0073411 A1 | 4/2003 | Meade, II | |
| 2004/0054816 A1 | 3/2004 | Carapelli | |
| 2004/0198374 A1 | 10/2004 | Bajikar | |
| 2004/0203768 A1 | 10/2004 | Ylitalo | |
| 2005/0094902 A1 | 5/2005 | Zhang et al. | |
| 2005/0221844 A1 * | 10/2005 | Trethewey | H04W 4/029 455/456.6 |
| 2006/0030338 A1 * | 2/2006 | Harken et al. | 455/456.6 |

(Continued)

OTHER PUBLICATIONS

International Search Report for PCT Application No. PCT/US2008/060759 dated Dec. 9, 2008.

(Continued)

*Primary Examiner* — Elias Mamo
(74) *Attorney, Agent, or Firm* — Insigne PC

(57) ABSTRACT

A method for automatically configuring a portable device comprises determining a position of the portable device and automatically configuring the portable device based on the determined position.

27 Claims, 4 Drawing Sheets

(56) References Cited

U.S. PATENT DOCUMENTS

| | | | |
|---|---|---|---|
| 2006/0084417 A1* | 4/2006 | Melpignano | H04L 12/5692 455/418 |
| 2006/0116160 A1* | 6/2006 | Fuccello | 455/556.1 |
| 2006/0211421 A1 | 9/2006 | Vuong et al. | |
| 2006/0293063 A1* | 12/2006 | Corrion | 455/456.1 |
| 2007/0077889 A1* | 4/2007 | Blight et al. | 455/41.2 |
| 2008/0045172 A1 | 2/2008 | Narayanaswami et al. | |
| 2008/0090520 A1 | 4/2008 | Camp et al. | |
| 2008/0192129 A1 | 8/2008 | Walker et al. | |

OTHER PUBLICATIONS

European Search Report for European Application No. 08826368.6, dated Oct. 25, 2011.
European Communication pursuant to Article 94(3) for European Application No. 08826368.6, dated Nov. 9, 2011.
Office Action for U.S. Appl. No. 11/738,337 dated Jan. 8, 2010.
Office Action for U.S. Appl. No. 11/738,337 dated Jul. 7, 2010.
Office Action for U.S. Appl. No. 11/738,337 dated Feb. 16, 2011.
Office Action for U.S. Appl. No. 11/738,337 dated Aug. 29, 2011.
Office Action for U.S. Appl. No. 11/738,337 dated Mar. 27, 2012.
Office Action for U.S. Appl. No. 11/738,337 dated Aug. 15, 2012.
Office Action for U.S. Appl. No. 11/738,337 dated Feb. 27, 2013.
Notice of Allowance for U.S. Appl. No. 11/738,337 dated Jun. 21, 2013.

* cited by examiner

POSITION-BASED AUTOMATIC CONFIGURATION OF PORTABLE DEVICE

BACKGROUND OF THE INVENTION

The present invention relates generally to the field of electronic devices. More specifically, the invention relates to automatic configuration of portable devices.

Many devices are typically configured to use or access peripheral devices such as printers and network connections. For example, in an office environment with numerous printers, an individual's desktop computer may be configured to use a particular printer as a default. The selection of the printer is typically a manual process which allows the user to change the selection as desired.

A user with a portable device, such as a laptop computer, may carry the device to numerous locations. For example, a user working for a company with multiple offices may be required to travel to the various offices on a regular basis. Each time the user changes his location, he must manually configure the portable device to select appropriate peripherals.

It would be desirable to provide for automatic configuration of the portable device in such situations.

SUMMARY OF THE INVENTION

One aspect of the invention relates to a method for configuring a portable device. The method comprises determining a position of the portable device and automatically configuring the portable device based on the determined position.

In one embodiment, the determining a position is based on a global positioning system (GPS) determination. In another embodiment, the determining a position is based on a determination using a cellular network.

In a particular embodiment, the configuring includes selecting one or more peripherals for use by the portable device. The one or more peripherals may include a printer or a network connection.

In one embodiment, the configuring the portable device includes configuring access to resources available at the current position of the portable device. Configuring access to resources may include one of the following: selecting a mode of network access, configuring access rights to one or more files, and disabling one or more ports or peripherals.

In one embodiment, the configuring the portable device includes selecting a profile based on the position from one or more profiles stored on the portable device.

In one embodiment, the determining a position of the portable device includes determining whether the position has changed from an earlier position. The determining whether the position has changed from an earlier position may be determined upon startup of the device. Alternatively, the determining whether the position has changed from an earlier position may be determined substantially continuously.

In one embodiment, the position is one of a plurality of areas.

In another aspect of the invention, a portable device comprises a location module adapted to determine a current position of the portable device and a processor adapted to automatically configure the portable device based on the current position.

In another aspect, the invention includes a computer program product, embodied on a computer-readable medium, for configuring a portable device. The computer program product comprises computer code for determining a position of the portable device and computer code for automatically configuring the portable device based on the determined position.

DETAILED DESCRIPTION OF THE PREFERRED EMBODIMENTS

Figure 1:
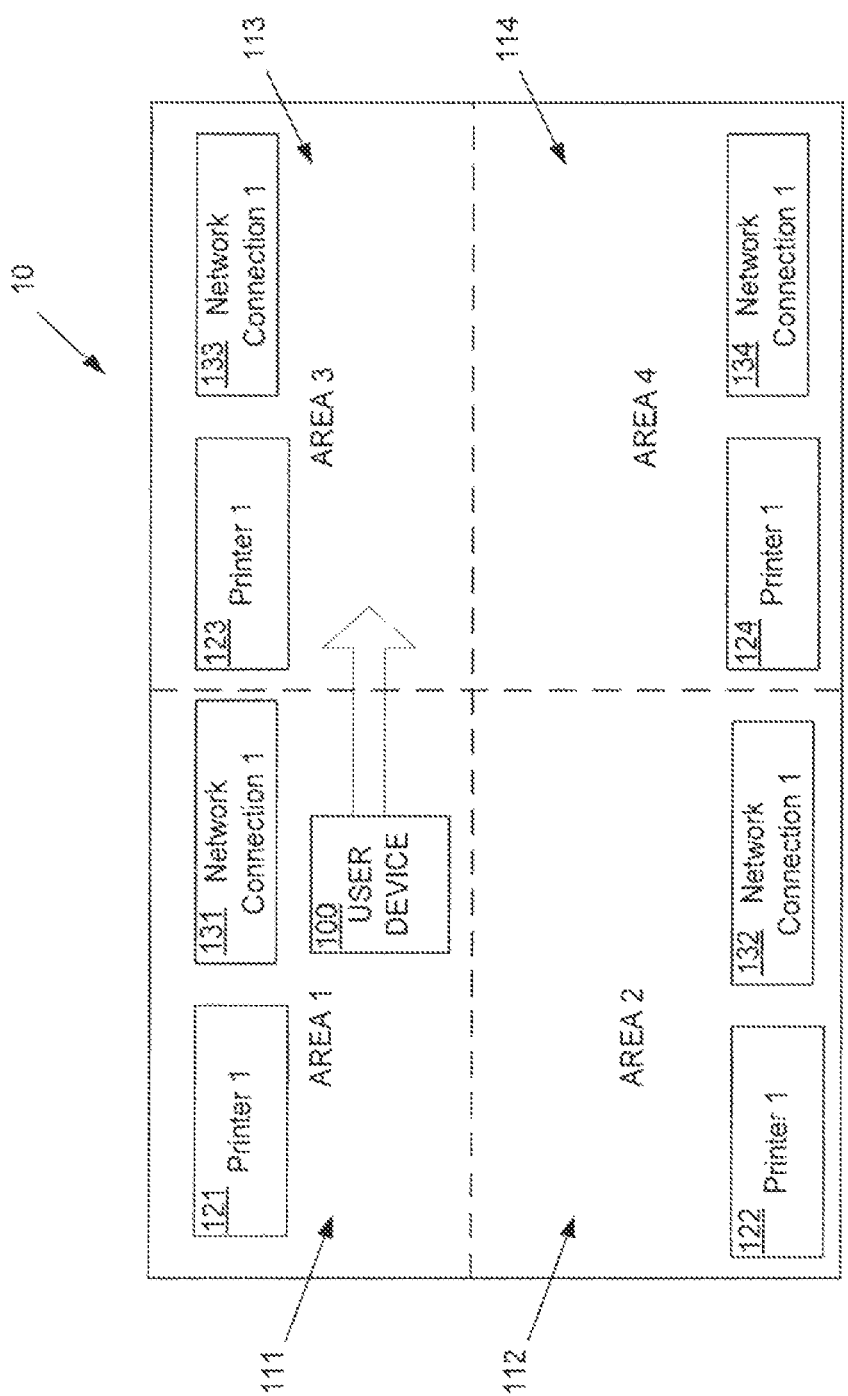
FIG. 1 is a block diagram illustrating a system with a portable device according to an embodiment of the present invention.

Referring to FIG. 1, a system with a portable device 100 according to an embodiment of the present invention is exemplarily illustrated. The system 10 represents an environment in which a portable device 100 may operate. The portable device 100 may be one of a number of portable devices, such as laptop computers, personal digital assistants (PDAs) or portable phones, for example. An exemplary portable device 100 is described below with reference to FIG. 2.

Referring again to FIG. 1, the system 10 includes a plurality of areas 111-114 within and across which the portable device 100 can move. Each area 111-114 may represent a region of the country, a state, a city, a building, a floor within a building, a zone, an office, a cubicle or the like. Further, although the areas 111-114 illustrated in FIG. 1 are shown as adjacent to one another, in certain embodiments, the areas may be disjointed. For example, one area may be a single floor on one building in City A, while the next area may be a building in City B.

The portable device 100 is illustrated in FIG. 1 as moving from Area 1 (111) to Area 3 (113). In one embodiment, the portable device 100 is shut down in Area 1 (111), moved to Area 3 (113) and restarted. In another embodiment, the movement of the portable device 100 occurs with the device operating continuously.

Each area 111-114 is provided with one or more peripheral devices. In the example illustrated in FIG. 1, each area 111-114 is provided with a printer 121-124 and a network connection 131-134. As will be appreciated by those skilled in the art, different areas may be equipped with different set of peripherals. For example, areas may be provided with any number of printers or multiple network connections. An area may include an Ethernet connection for a local area network (LAN) in addition to a wireless local area network connection. In addition to printers and network connections, other peripherals may also be provided.

Figure 2:
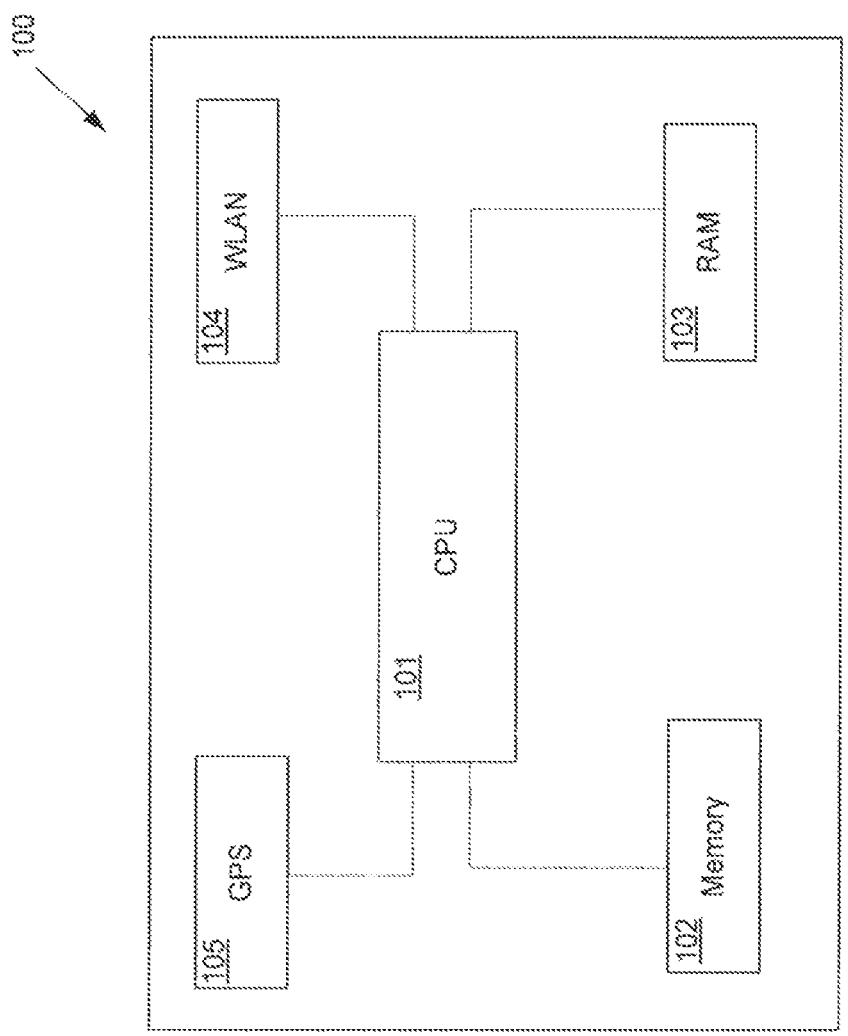
FIG. 2 is a block diagram of the portable device of FIG. 1 according to an embodiment of the present invention.

Referring now to FIG. 2, an embodiment of a portable device 100 is illustrated. As noted above, the portable device 100 may be a laptop computer, a PDA, a portable phone or any other portable device. For purposes of simplicity, the portable device 100 is only shown with certain components. Those skilled in the art will appreciate that such a portable device may include numerous other components and may lack certain illustrated components.

The portable device 100 includes a central processing unit (CPU) 101 adapted to control the overall operation of the portable device 100. The CPU 101 may be configured with an operating system and a variety of other software components. The portable device 100 is also provided with a memory device 102, which may take the form of a hard disk, for example. In some embodiments, either in addition to or in place of the memory device 102, the portable device 100 may include a removable memory device, such as a flash drive, CD-ROM, CD-R, CD-R/W or any other computer-readable medium, for example. The removable memory device may include either data or various computer program products with computer code. Additionally, the portable device 100 includes a random access memory (RAM) 103.

The portable device 100 also includes a communication module 104 to allow the portable device 100 to communicate with other components, for example, in a network such as a local area network (LAN). The communication module 104 may be adapted to communicate through a variety of protocols including, for example, wireless local area network (WLAN) or an Ethernet connection. Of course, numerous other communication protocols may be used.

The portable device 100 illustrated in FIG. 1 also includes a location module 105. The location module 105 is adapted to facilitate detection or determination of the location of the portable device 100. In one embodiment, the location module 105 is a global positioning system (GPS) module which uses GPS positioning to facilitate determination of the location. In another embodiment, the location module 105 is adapted to use a cellular network to determine its location. In this regard, the location module may be adapted to transmit and receive signals from a cellular network, allowing the cellular network to determine the position of the portable device 100 (e.g., through triangulation) and transmit the location to the portable device. Other methods of location determination will be apparent to those skilled in the art and are contemplated within the scope of the present invention.

Now, with reference to FIGS. 3A, 3B, 4A and 4B, various methods of automatically configuring the portable device 100 will be described. Each method may be implemented on the portable device 100 in either the CPU 101 or the RAM 103, for example. The method may be implemented as a computer program product on a computer-readable medium, such as a disk, for installation on a portable device.

Figures 3A, 3B:
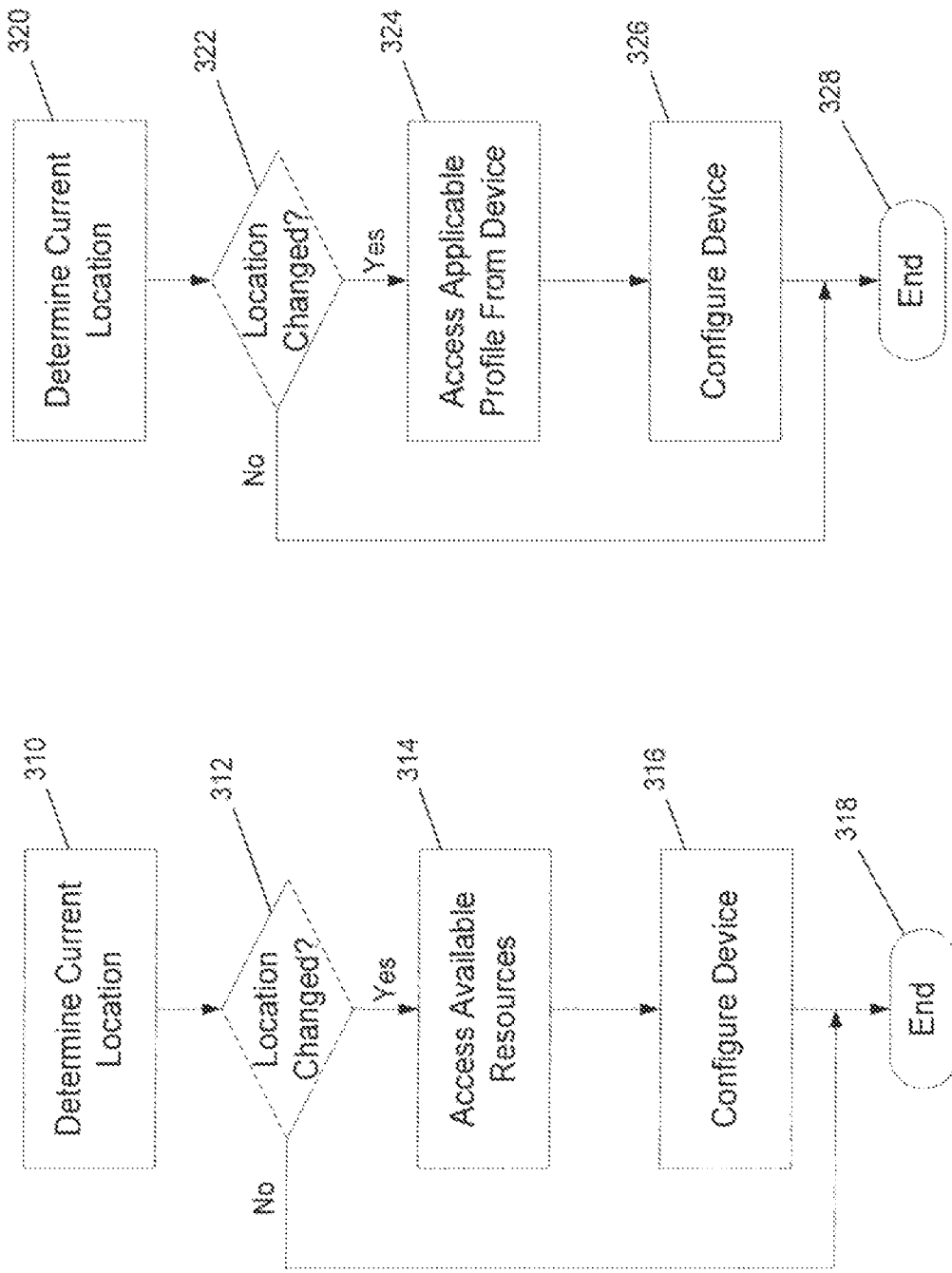
FIG. 3A is a flow chart illustrating a method for configuring a portable device according to an embodiment of the present invention.
FIG. 3B is a flow chart illustrating a method for configuring a portable device according to another embodiment of the present invention.

Referring first to FIG. 3A, upon each startup of the portable device 100, the current location of the portable device 100 is determined (block 310). This may be achieved using a GPS determination by the location module 105 illustrated in FIG. 1, for example. In this regard, the location module 105 may determine the location as a set of coordinates. Alternatively, the location module 105 may translate the coordinates to a particular region of the country, a state, a city, a building, a floor within a building, a zone, an office, a cubicle or the like. For example, in one embodiment, the location module 105 may determine in which office of a multi-city company the portable device is currently located.

At block 312, it is determined whether the location of the portable device 100 has changed. In this regard, the current position may be compared to the position of the portable device 100 when it was previously shut down or at the previous startup. If the location has not changed, no changes are made, and the process terminates at block 318. On the other hand, if the location of the portable device is determined to have changed, the resources available to the portable device 100 at the current location are accessed (block 314). In this regard, the portable device 100 may perform a scan of the network to determine which peripherals are available at the current location. For example, the portable device 100 may scan and determine that multiple printers are available.

Next, at block 316, the portable device 316 is configured based on its current location. In this regard, configuration may includes a variety of operations and/or actions taken by the portable device 316. For example, configuration of the device may include selecting one or more peripherals for use by the portable device. Thus, the portable device may be configured to select one or more printers or network connections as being available for use. Further, the configuration of the portable device may include configuring access to resources, such as selecting one or more modes of accessing the network (e.g., wireless, LAN, etc.), configuring read/write/edit rights for one or more files or folders available on the network, or disabling one or more ports or peripherals.

In this regard, the available resources may be analyzed in order to select specific resources. For example, a particular printer may be selected as the default printer. The selection may be subject to certain restrictions or preferences included in the portable device 100. For example, the portable device 100 may include a preference for printers which can print on two sides, or the portable device 100 may include a restriction to not select a color printer. Taking these restrictions and preferences into account, one of the available printers may be selected as the default. In addition to the selection of the default printer, the portable device 100 may be configured for other peripherals as well.

Referring now to FIG. 3B, another embodiment of a method of automatically configuring the portable device is illustrated. The method illustrated in FIG. 3B is similar to that of FIG. 3A in many respects but varies in the selection of the resources. Again, upon each startup of the portable device 100, the current location of the portable device 100 is determined (block 320). At block 322, it is determined whether the location of the portable device 100 has changed. If the location has not changed, no changes are made, and the process terminates at block 328.

On the other hand, if the location of the portable device 100 is determined to have changed, the resources available to the portable device 100 at the current location are accessed (block 324). In this regard, rather than performing a scan, the portable device 100 accesses one of a plurality of profiles stored in, for example, the memory device 102. A separate profile may be provided for each location, such as each office of a multi-city company. The profile corresponding to the current location is accessed, and the selections identified in the profile are selected for configuration of the portable device. At block 326, the portable device 100 is accordingly configured.

Figure 4B:
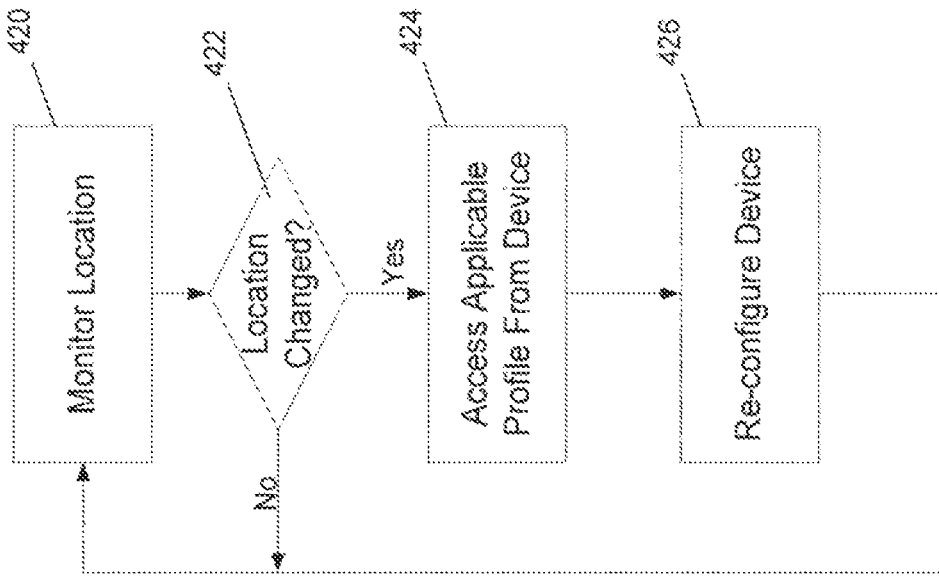
FIG. 4B is a flow chart illustrating a method for configuring a portable device according to another embodiment of the present invention.
Figure 4A:
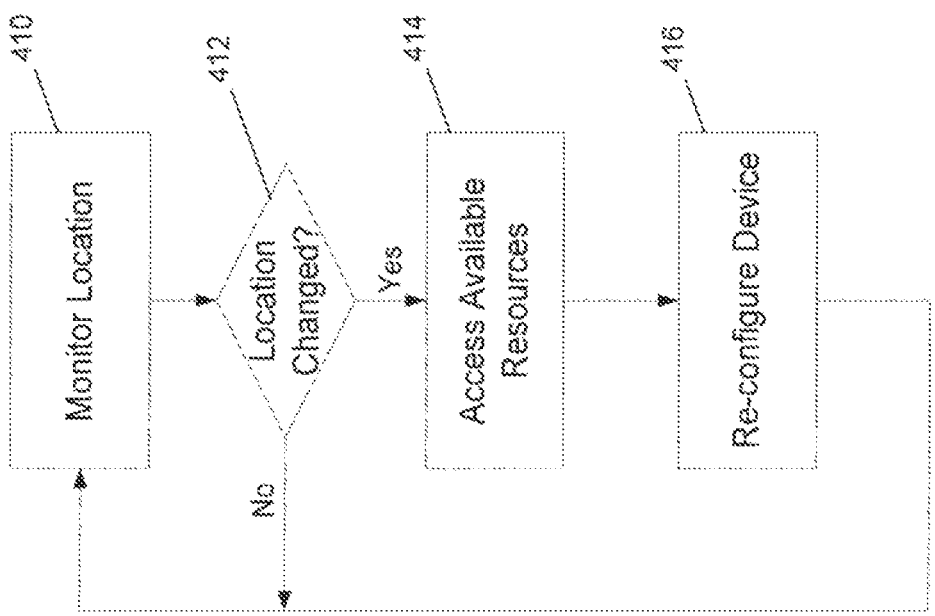
FIG. 4A is a flow chart illustrating a method for configuring a portable device according to another embodiment of the present invention.

Rather than determining the location of the portable device 100 at startup, in some embodiments, the location is monitored on a regular basis during the operation of the portable device. In one embodiment, the location is monitored substantially continuously (e.g., 1 Hz). In this regard, location changes during operation of the portable device can be used to reconfigure the portable device. For example, a user moving from his office in a building to a conference room may desire to have the default printer changed to one that is closer to the conference room. FIGS. 4A and 4B illustrate two methods according to embodiments of the present invention in which the location of the portable device is monitored on a regular basis, and the portable device is reconfigured when the location is determined to have changed.

With reference to FIG. 4A, the current location of the portable device 100 is determined (block 410). At block 412, it is determined whether the location of the portable device 100 has changed. If the location has not changed, no changes are made, and the process returns to block 410 to continue monitoring the location of the portable device. On the other hand, On the other hand, if the location of the portable device is determined to have changed, the resources available to the portable device 100 at the current location are accessed (block 414). In this regard, the portable device 100 may perform a scan of the network to determine which peripherals are available at the current location. Next, at block 416, the portable device 316 is configured based on its current location, and the process returns to block 410 to continue monitoring the location of the portable device.

With reference now to FIG. 4B, the current location of the portable device 100 is determined (block 420). At block 422, it is determined whether the location of the portable device 100 has changed. If the location has not changed, no changes are made, and the process returns to block 420 to continue monitoring the location of the portable device. On the other hand, if the location of the portable device 100 is determined to have changed, the resources available to the portable device 100 at the current location are accessed (block 424). In this regard, the portable device 100 accesses one of a plurality of profiles stored in, for example, the memory device 102. A separate profile may be provided for each location, such as each office of a multi-city company. The profile corresponding to the current location is accessed, and the selections identified in the profile are selected for configuration of the portable device. At block 426, the portable device 100 is accordingly configured, and the process returns to block 420 to continue monitoring the location of the portable device.

While particular embodiments of the present invention have been disclosed, it is to be understood that various different modifications and combinations are possible and are contemplated within the true spirit and scope of the appended claims. There is no intention, therefore, of limitations to the exact abstract and disclosure herein presented.

What is claimed is:

1. A method for configuring a portable device, comprising:
   monitoring location of the portable device to determine whether a current position of the portable device has changed from a previous position;
   connecting to a local network located at the current position;
   subsequent to the current position being determined to have changed from the previous position, dynamically determining all currently available external resources at the current position by immediately scanning for all available external resources connected to the local network at the current position, and
   automatically configuring the portable device to access at least one of the available external resources based on the dynamically determined currently available external resources at the current position and on one or more resource preferences stored in memory of the portable device, wherein configuring the portable device to access at least one of the available external resources includes selecting a mode of access to a network for use with the portable device, configuring access rights to one or more files, and disabling one or more port or peripherals.

2. The method of claim 1, wherein the monitoring location of the portable device comprises determining the current position based on a global positioning system (GPS) determination.

3. The method of claim 1, wherein the monitoring location of the portable device comprises determining the current position based on determination using a cellular network.

4. The method of claim 1, wherein the currently available external resources includes one or more peripherals and wherein configuring the portable device includes selecting the one or more peripherals for use by the portable device.

5. The method of claim 4, wherein the one or more peripherals includes a network-accessible storage device located at the current position and connected to the local network.

6. The method of claim 1, wherein the one or more resource preferences include at least one of a preference to use a type of peripheral device, a restriction not to use a type of peripheral device, and a default type of peripheral device.

7. The method of claim 1, wherein the monitoring location of the portable device to determine whether the current position has changed from the previous position is performed upon detecting the local network.

8. The method of claim 1, wherein the monitoring location of the portable device to determine whether the current position has changed from the previous position is performed substantially continuously.

9. The method of claim 1, wherein the position is one of a plurality of areas.

10. A portable device, comprising:
    a location module to monitor a location of the portable device to determine whether a current position of the portable device has changed from a previous position; and
    a processor to, subsequent to the current position being determined to have changed from the previous position, dynamically determine all currently available external resources at the current position by immediately scanning for all available external resources connected to a local network at the current position,
    wherein the processor automatically configures the portable device to access at least one of the available external resources based on the dynamically determined currently available external resources at the current position and on one or more resource preferences stored in memory of the portable device, selects a mode of access to a network for use with the portable device, configures access rights to one or more files, and disables one or more ports or peripherals.

11. The device of claim 10, wherein the location module uses the global positioning system (GPS).

12. The device of claim 10, wherein the location module uses a cellular network to determine the current position.

13. The device of claim 10, wherein the currently available external resources include one or more peripherals and wherein the processor automatically configures the portable device by selecting the one or more peripherals for use by the portable device.

14. The device of claim 13, wherein the one or more peripherals includes a network-accessible storage device located at the current position and connected to the local network.

15. The device of claim 10, wherein the one or more resource preferences include at least one of a preference to use a type of peripheral device, a restriction not to use a type of peripheral device, and a default type of peripheral device.

16. The device of claim 10, wherein the location module monitors location of the portable device to determine whether the position has changed from the previous position upon detecting the local network.

17. The device of claim 10, wherein the location module monitors location of the portable device to determine whether the position has changed from the previous position substantially continuously.

18. The device of claim 10, wherein the position is one of a plurality of areas.

19. A computer program product, embodied on a non-transitory computer-readable medium, for configuring a portable device, comprising:
  computer code for monitoring location of the portable device to determine whether a current position of the portable device has changed from a previous position;
  computer code for connecting to a local network located at the current position;
  computer code for, subsequent to the current position being determined to have changed from the previous position, dynamically determining all currently available external resources at the current position by immediately scanning for all available external resources connected to the local network at the current position; and
  computer code for automatically configuring the portable device to access at least one of the available external resources based on the dynamically determined currently available external resources at the current position and on one or more resource preferences stored in memory of the portable device, selecting a mode of access to a network for use with the portable device, configuring access rights to one or more files, and disabling one or more ports or peripherals.

20. The computer program product of claim 19, wherein the computer code for monitoring location of the portable device to determine the current position uses a global positioning system (GPS) determination.

21. The computer program product of claim 19, wherein the computer code for monitoring location of the portable device to determine the current position uses a cellular network to determine the current position.

22. The computer program product of claim 19, wherein the currently available external resources include one or more peripherals and wherein the computer code for configuring includes computer code for selecting the one or more peripherals for use by the portable device.

23. The computer program product of claim 22, wherein the one or more peripherals includes a network-accessible storage device located at the current position and connected to the local network.

24. The computer program product of claim 19, wherein the one or more resource preferences included at least one of a preference to use a type of peripheral device, a restriction not to use a type of peripheral device, and a default type of peripheral device.

25. The computer program product of claim 19, wherein the computer code for monitoring location of the portable device to determine whether the current position has portable changed from the previous position determines position upon detecting the local network.

26. The computer program product of claim 19, wherein the computer code for monitoring location of the portable device to determine whether the current position has changed from the previous position determines position substantially continuously.

27. The computer program product of claim 19, wherein the position is one of a plurality of areas.

* * * * *